United States Patent
Cheng

(10) Patent No.: US 9,555,751 B1
(45) Date of Patent: Jan. 31, 2017

(54) FUEL-SAVING AND ENERGY-SAVING CAR CONTROLLER

(71) Applicant: DONG DI TECHNOLOGY CO., LTD., Sioushuei Township, Changhua County (TW)

(72) Inventor: Ming-Hung Cheng, Sioushuei Township (TW)

(73) Assignee: Dong Di Technology Co., Ltd., Sioushuei Township (TW)

( * ) Notice: Subject to any disclaimer, the term of this patent is extended or adjusted under 35 U.S.C. 154(b) by 0 days.

(21) Appl. No.: 14/961,959

(22) Filed: Dec. 8, 2015

(51) Int. Cl.
    *F02B 39/10* (2006.01)
    *B60R 16/023* (2006.01)
    *F02D 11/10* (2006.01)
    *F02D 41/28* (2006.01)
    *F02D 41/00* (2006.01)
    *F02D 23/00* (2006.01)
    *F02M 35/10* (2006.01)
    *F02B 33/34* (2006.01)

(52) U.S. Cl.
    CPC .......... *B60R 16/0236* (2013.01); *F02B 33/34* (2013.01); *F02B 39/10* (2013.01); *F02D 11/10* (2013.01); *F02D 23/00* (2013.01); *F02D 41/0007* (2013.01); *F02D 41/28* (2013.01); *F02M 35/10157* (2013.01)

(58) Field of Classification Search
    CPC ........... F02B 33/34; F02B 33/36; F02B 33/38; F02B 33/40; F02B 39/10
    USPC .......................................................... 123/565
    See application file for complete search history.

(56) References Cited

U.S. PATENT DOCUMENTS

2006/0122762 A1* 6/2006 Perkins ............... F02B 29/0481
    701/102
2008/0219866 A1* 9/2008 Kwong .................... B60K 6/46
    417/410.1

* cited by examiner

*Primary Examiner* — Erick Solis
(74) *Attorney, Agent, or Firm* — Alan D. Kamrath; Kamrath IP Lawfirm, P.A.

(57) ABSTRACT

A fuel-saving and energy-saving car controller includes a power supercharge control box (51) electrically connected with a direct-current brushless motor (41) of a power supercharger (40). The power supercharge control box includes a communication module which reads data in the on-board diagnostics (8) and the car computer (7) so as to detect a rotation speed of the engine (20). Thus, the communication module transmits a signal to the single-chip control circuit (1) which drives the motor actuating circuit (42) which controls the direct-current brushless motor to regulate a rotation speed of the air inlet fan (44).

2 Claims, 7 Drawing Sheets

FUEL-SAVING AND ENERGY-SAVING CAR CONTROLLER

BACKGROUND OF THE INVENTION

1. Field of the Invention

The present invention relates to a car controller and, more particularly, to a car controller for increasing the air input of a car engine.

2. Description of the Related Art

A conventional car engine supercharger is a mechanic supercharger which includes a belt and a belt wheel to connect an air inlet fan. When the car engine is operated, the car engine drives the belt and the belt wheel to operate the air inlet fan to increase the air flow from the air inlet pipe into the car engine so as to enhance the working efficiency of the car engine. However, the air flow cannot be controlled precisely by the car computer so that the air flow introduced into the car engine is often too large. Thus, when the car is driven at a high speed, the air flow is too large so that the fuel output is too large, and the fuel is not burned completely, thereby easily causing a carbon deposition and wasting the fuel. In addition, when the car engine is under an idling operation, the air inlet fan is operated successively so that the air inlet fan easily produces noise under the idling operation of the car engine, thereby causing an uncomfortable sensation to the driver.

Another conventional car engine supercharger is a turbocharger which includes a turbine and an air inlet pipe. When in use, the car engine produces wasted gas during operation. The wasted gas produced by the car engine drives the turbine which is rotated in the air inlet pipe to increase the air flow from the air inlet pipe into the car engine so as to enhance the working efficiency of the car engine. However, when the car engine is operated at a lower rotation speed, the flow rate of the wasted gas is reduced so that the wasted gas cannot drive the turbine efficiently, thereby decreasing the working efficiency of the car engine. In addition, the turbocharger is not connected with an air input detector so that the turbocharger cannot precisely control the fuel output according to the air input, and cannot achieve a fuel-saving effect.

BRIEF SUMMARY OF THE INVENTION

The primary objective of the present invention is to provide a fuel-saving and energy-saving car controller.

In accordance with the present invention, there is provided a fuel-saving and energy-saving car controller comprising a power supercharge control box electrically connected with a direct-current brushless motor of a power supercharger. The power supercharger has a first end connected with an engine. An air cleaner is mounted on a second end of the power supercharger. The direct-current brushless motor is mounted in the power supercharger and is provided with an air inlet fan. An air input detector is mounted on the power supercharger. An air throttle is mounted on the engine and is electrically connected with an accelerator pedal to control an air inlet flow into the engine. A fuel injection supply device is connected with the engine. The fuel injection supply device is electrically connected with the air input detector and the accelerator pedal. The air input detector detects the air inlet flow through the air cleaner and the power supercharger into the engine and transmits a signal to the fuel injection supply device so that the fuel injection supply device injects a determined amount of fuel. The accelerator pedal is driven by a driver's pedaling force to control an air input of the air throttle and to control a fuel output of the fuel injection supply device. The power supercharge control box is electrically connected with a car battery. The power supercharge control box includes a single-chip control circuit, a motor actuating circuit electrically connected between the direct-current brushless motor and the single-chip control circuit, a liquid crystal display module electrically connected with the single-chip control circuit, a push button circuit electrically connected with the single-chip control circuit, a bleeder circuit electrically connected between the single-chip control circuit and the car battery, a buck circuit electrically connected with the car battery, and a communication module communicating between the single-chip control circuit and an on-board diagnostics. The car battery supplies an electric power to the direct-current brushless motor. The on-board diagnostics communicates with a car computer by a network. The communication module of the power supercharge control box reads data in the on-board diagnostics and the car computer so as to detect a rotation speed of the engine. The communication module transmits a signal to the single-chip control circuit which drives the motor actuating circuit which controls the direct-current brushless motor to regulate a rotation speed of the air inlet fan. The air input detector detects the air inlet flow through the air cleaner and the power supercharger into the engine and transmits a signal to the fuel injection supply device so that the fuel injection supply device injects a determined amount of fuel.

According to the primary advantage of the present invention, the communication module of the power supercharge control box reads the data in the on-board diagnostics and the car computer to detect the rotation speed of the engine, so that the fuel-saving and energy-saving car controller can properly increase the air input of the engine, without increasing the rotation speed of the engine, and without increasing the fuel output of the fuel injection supply device, such that the fuel is burned completely, thereby preventing the engine from incurring a carbon deposition, and thereby enhancing the working efficiency of the engine.

According to another advantage of the present invention, the car can travel a longer distance at the same amount of fuel, thereby saving the fuel and the energy.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
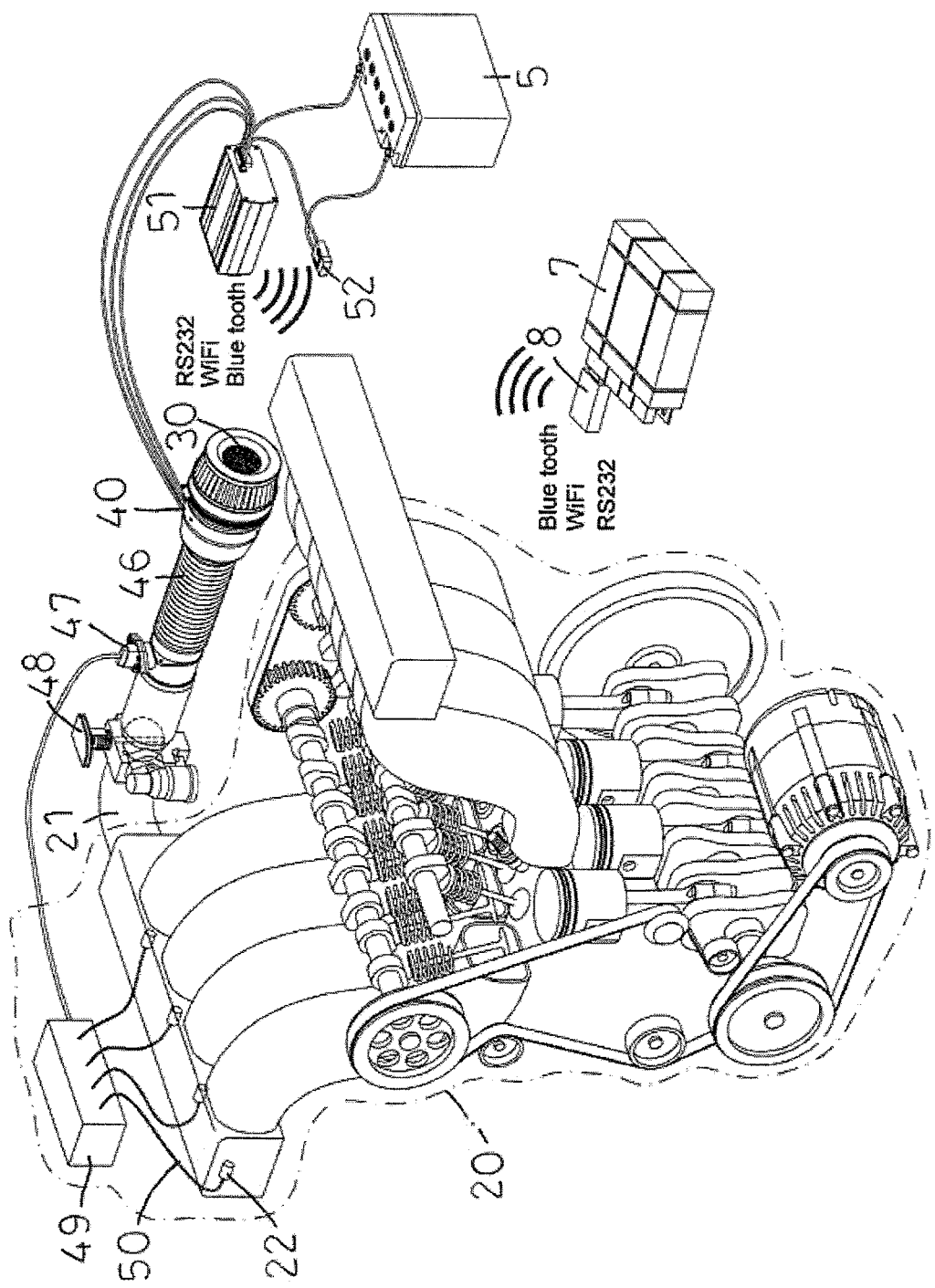
FIG. 1 is a perspective view of a fuel-saving and energy-saving car controller mounted on a car engine in accordance with the preferred embodiment of the present invention.

Referring to the drawings and initially to FIGS. 1-6, a fuel-saving and energy-saving car controller in accordance with the preferred embodiment of the present invention is connected with a power supercharger 40 and comprises a power supercharge control box 51 electrically connected with a direct-current brushless motor 41 of the power supercharger 40.

The power supercharger 40 has a first end provided with an air inlet pipe 46 connected with an air inlet 21 of an engine 20. An air cleaner 30 is mounted on a second end of the power supercharger 40 and locked by a retainer "C". The direct-current brushless motor 41 is mounted in the power supercharger 40. The direct-current brushless motor 41 of the power supercharger 40 has a rotor 43 provided with a bushing "R", an air inlet fan 44 and two washers "Q". A cone-shaped vortex generator 45 is locked onto a distal end of the rotor 43 to evenly distribute and diffuse the air flow in a vortex manner so that the air and the fuel are mixed completely to enhance the burning efficiency. In addition, the vortex generator 45 reduces the noise produced during rotation of the air inlet fan 44. An air input detector 47 is mounted on the air inlet pipe 46 of the power supercharger 40. An air throttle 48 is mounted on the air inlet 21 of the engine 20 and is electrically connected with an accelerator pedal (not shown) to control the air inlet flow into the engine 20. A fuel injection supply device 49 is mounted on the engine 20 and has a plurality of fuel pipes 50 connected with fuel inlets 22 of the engine 20. The fuel injection supply device 49 is electrically connected with the air input detector 47 and the accelerator pedal. The air input detector 47 detects the air inlet flow through the air cleaner 30 and the power supercharger 40 into the engine 20 and transmits a signal to the fuel injection supply device 49 so that the fuel injection supply device 49 injects a determined amount of fuel. The accelerator pedal is driven by a driver's pedaling force to control the air input of the air throttle 48 and to control the fuel output of the fuel injection supply device 49.

The power supercharge control box 51 is electrically connected with a car battery 5. A fuse 52 is mounted between the power supercharge control box 51 and the car battery 5 to prevent the direct-current brushless motor 41 from being burned or worn out due to an overload.

The power supercharge control box 51 includes a single-chip control circuit 1, a motor actuating circuit 42 electrically connected between the direct-current brushless motor 41 and the single-chip control circuit 1, a liquid crystal display module 2 electrically connected with the single-chip control circuit 1 to provide a display function, a push button circuit 3 electrically connected with the single-chip control circuit 1 to provide an operation function, a bleeder circuit 4 electrically connected between the single-chip control circuit 1 and the car battery 5, a buck circuit 6 electrically connected with the car battery 5, and a communication module communicating between the single-chip control circuit 1 and an on-board diagnostics (OBD) 8.

The car battery 5 supplies an electric power to the direct-current brushless motor 41. The liquid crystal display module 2 is preferably an organic light emitting diode (OLED). The on-board diagnostics 8 communicates with a car computer 7 by a network. The network is preferably a controller area network (CAN or CAN BUS) which is a communication protocol. The communication module includes a blue tooth communication module 9, a WiFi communication module 10 or an RS232 communication module 11. The RS232 is an interface standard of a serial information communication established by the American electronics industry association (EIA). The power supercharge control box 51 further includes a communication unit 12 communicating between the single-chip control circuit 1 and the car computer 7. The communication unit 12 is preferably a controller area network (CAN or CAN BUS). In practice, the communication unit 12 reads the data in the car computer 7 so as to detect the rotation speed of the engine 20. Then, the communication unit 12 transmits a signal to the single-chip control circuit 1 according to the detected rotation speed of the engine 20. Then, the single-chip control circuit 1 drives the motor actuating circuit 42 which controls the direct-current brushless motor 41 to regulate the rotation speed of the air inlet fan 44.

Figure 2:
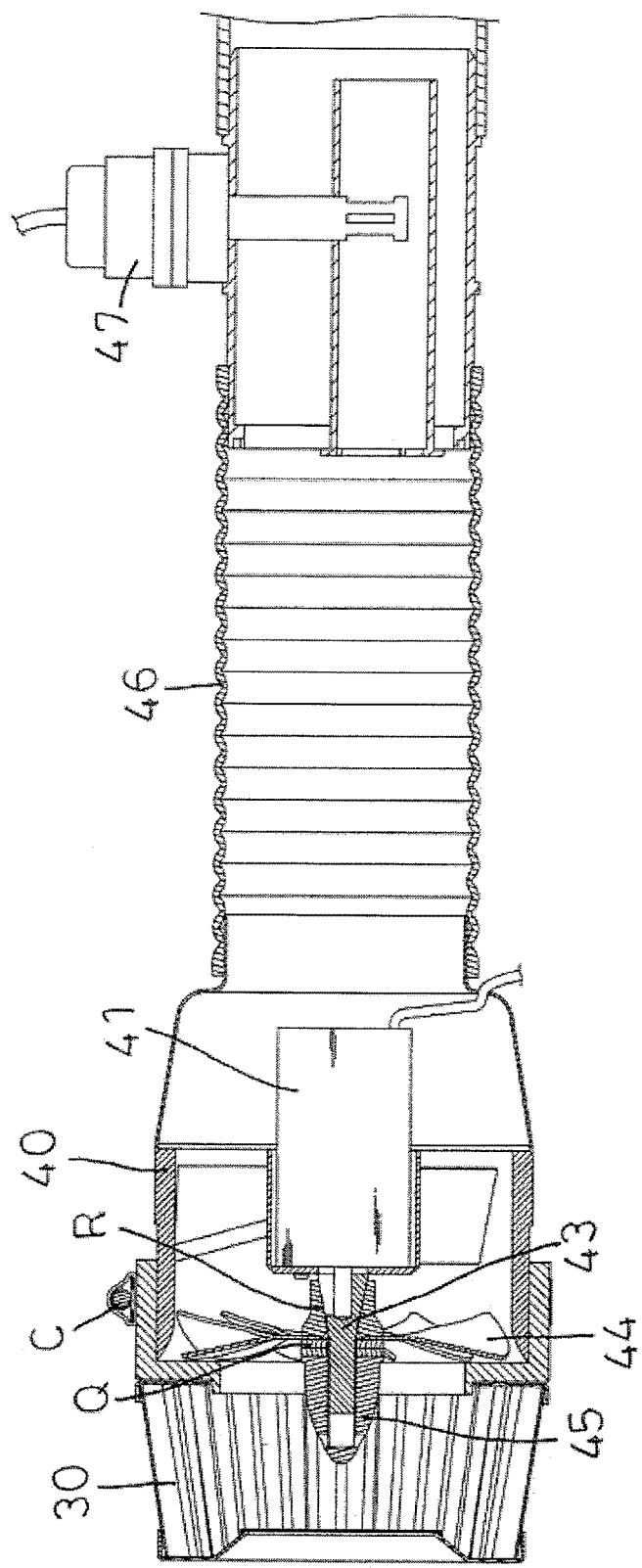
FIG. 2 is a partially cross-sectional view of FIG. 1.
Figure 3:
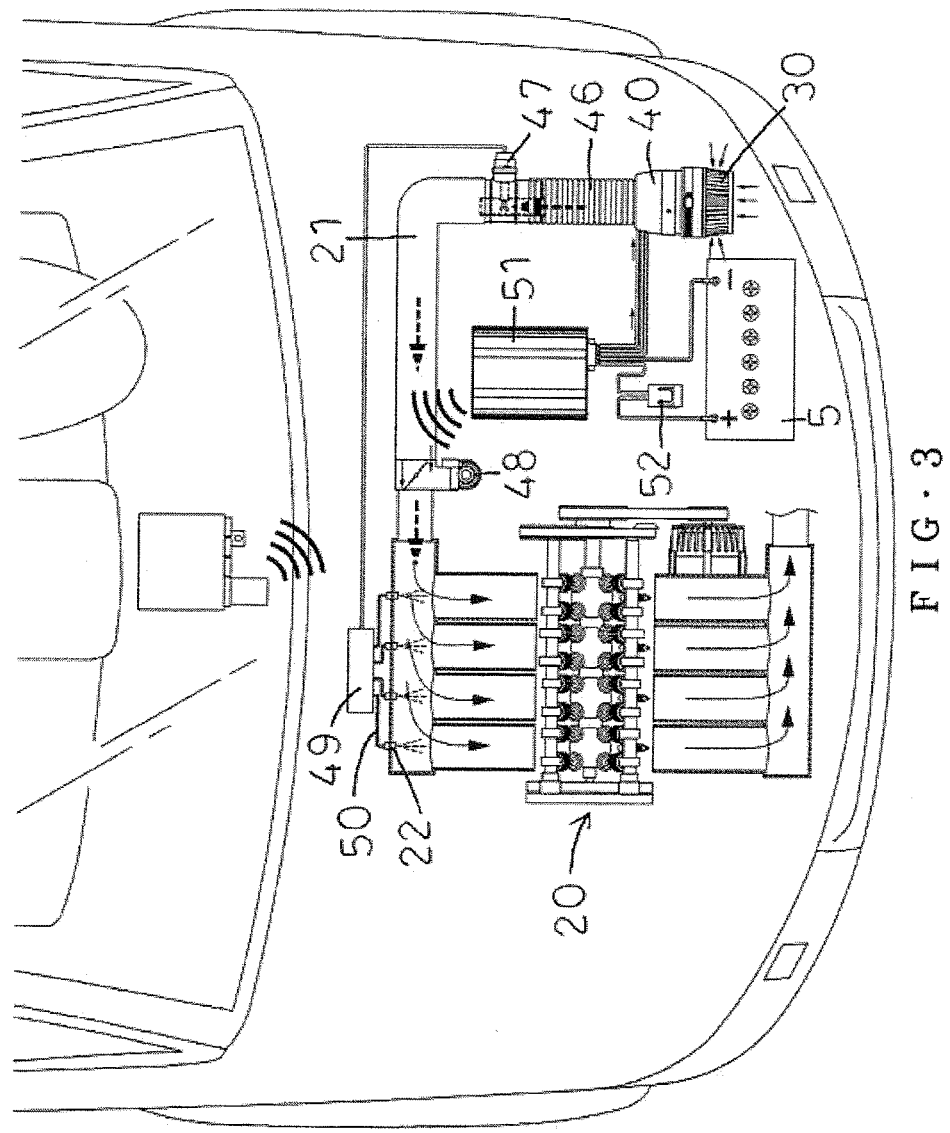
FIG. 3 is a schematic operational view of the fuel-saving and energy-saving car controller for the car in accordance with the preferred embodiment of the present invention.
Figure 4:
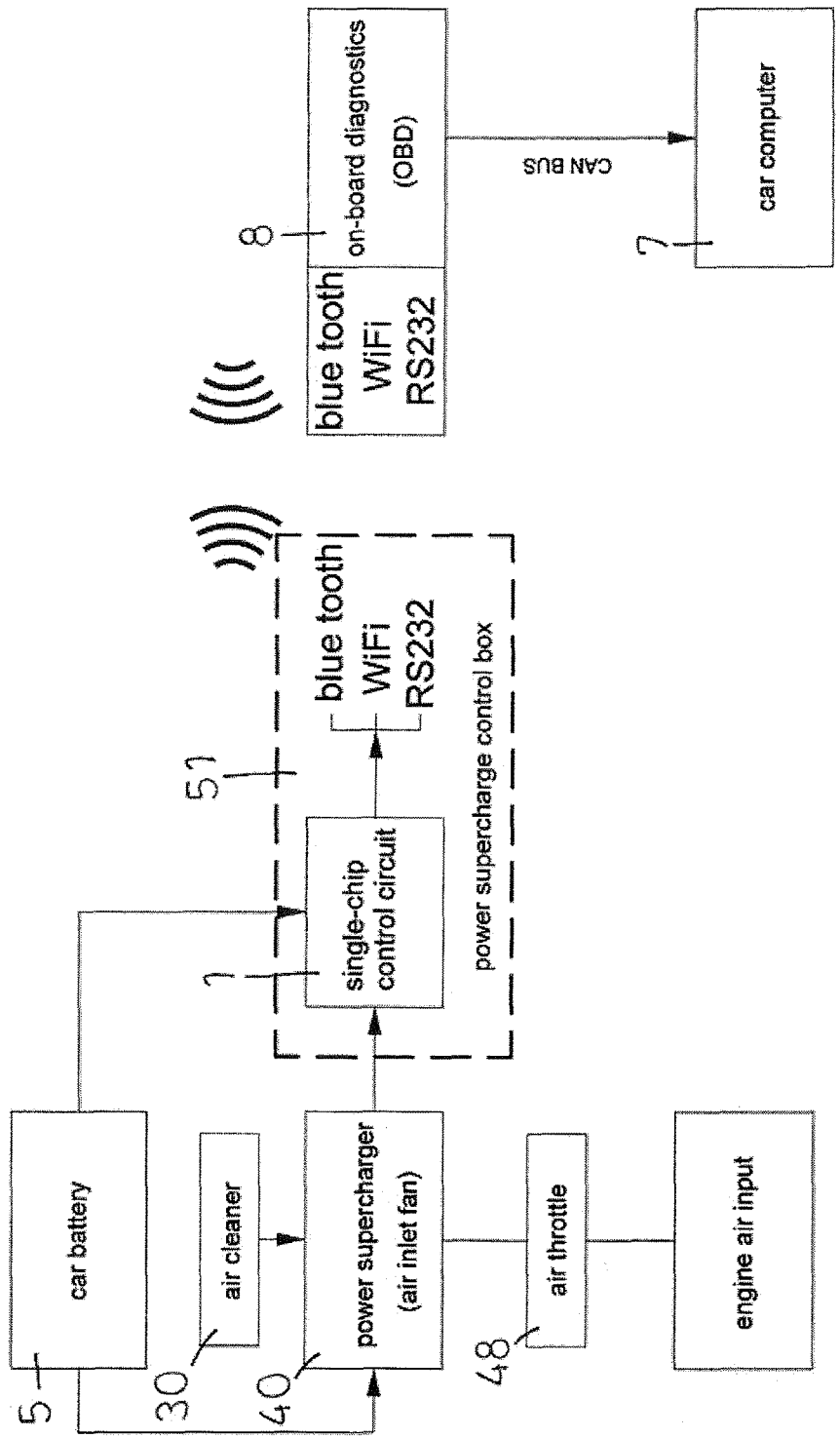
FIG. 4 is a schematic operational block diagram of the present invention.
Figure 5:
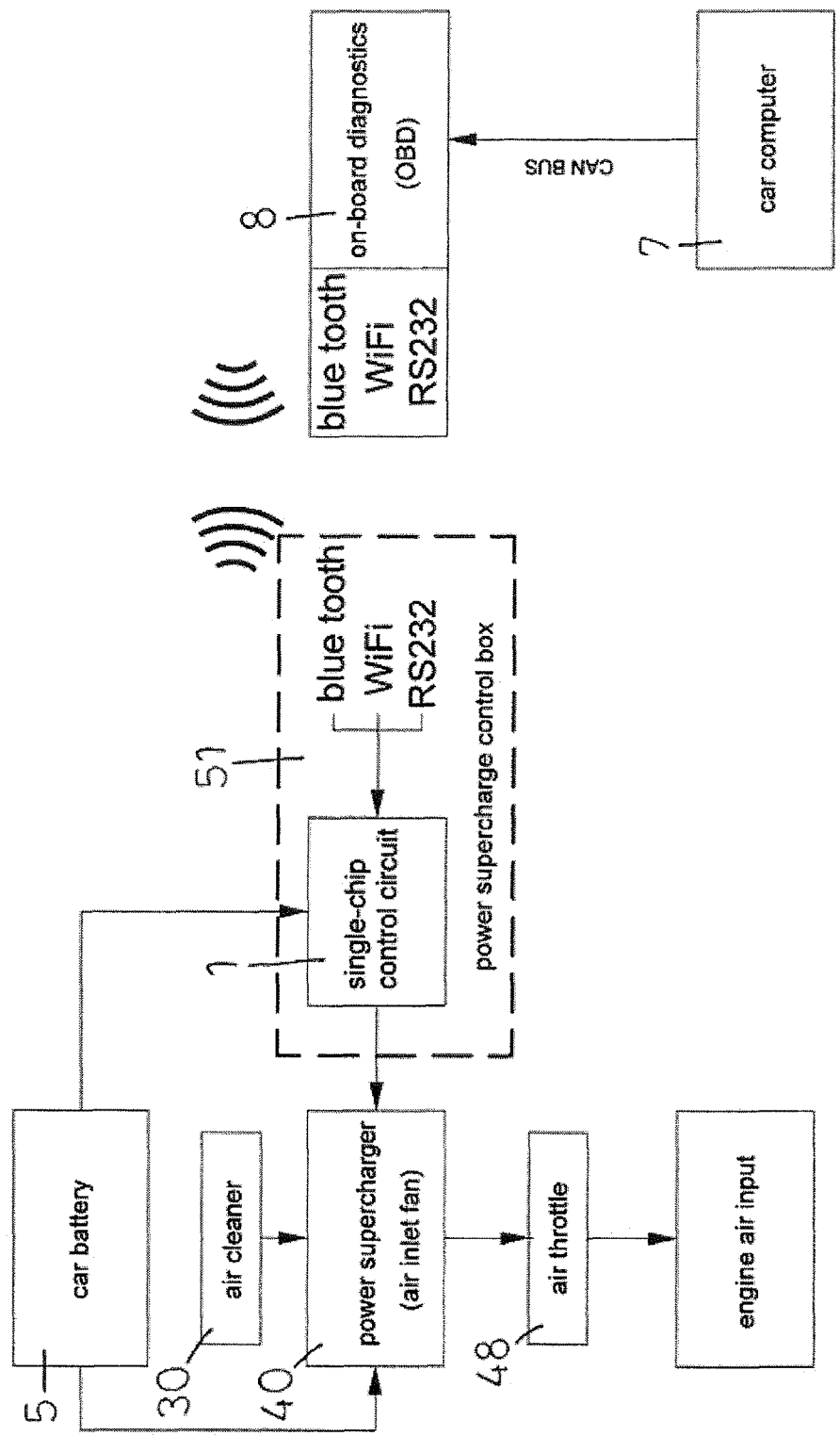
FIG. 5 is another schematic operational block diagram of FIG. 4.
Figure 6:
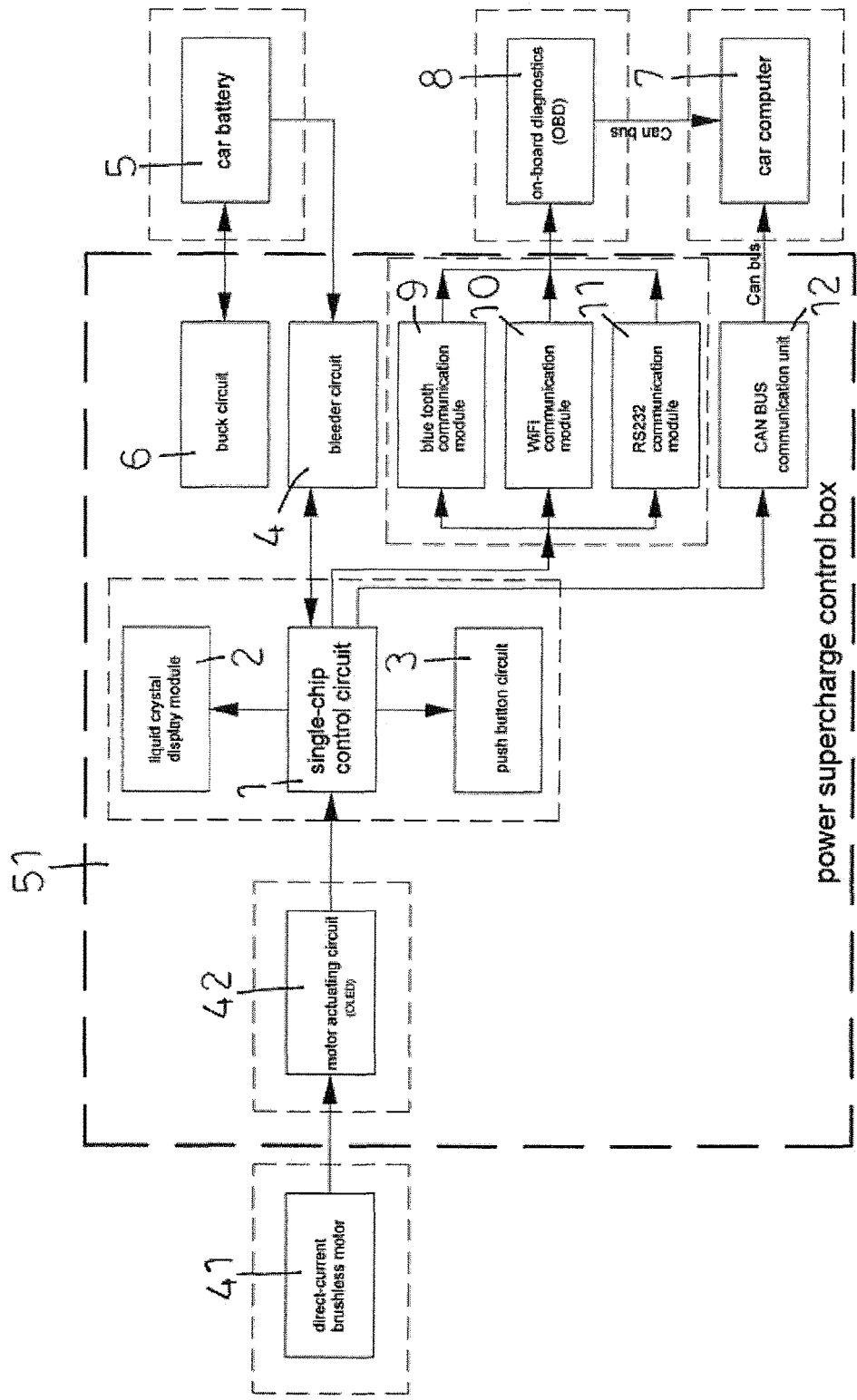
FIG. 6 is an operational block diagram of the fuel-saving and energy-saving car controller of the present invention.
Figure 7:
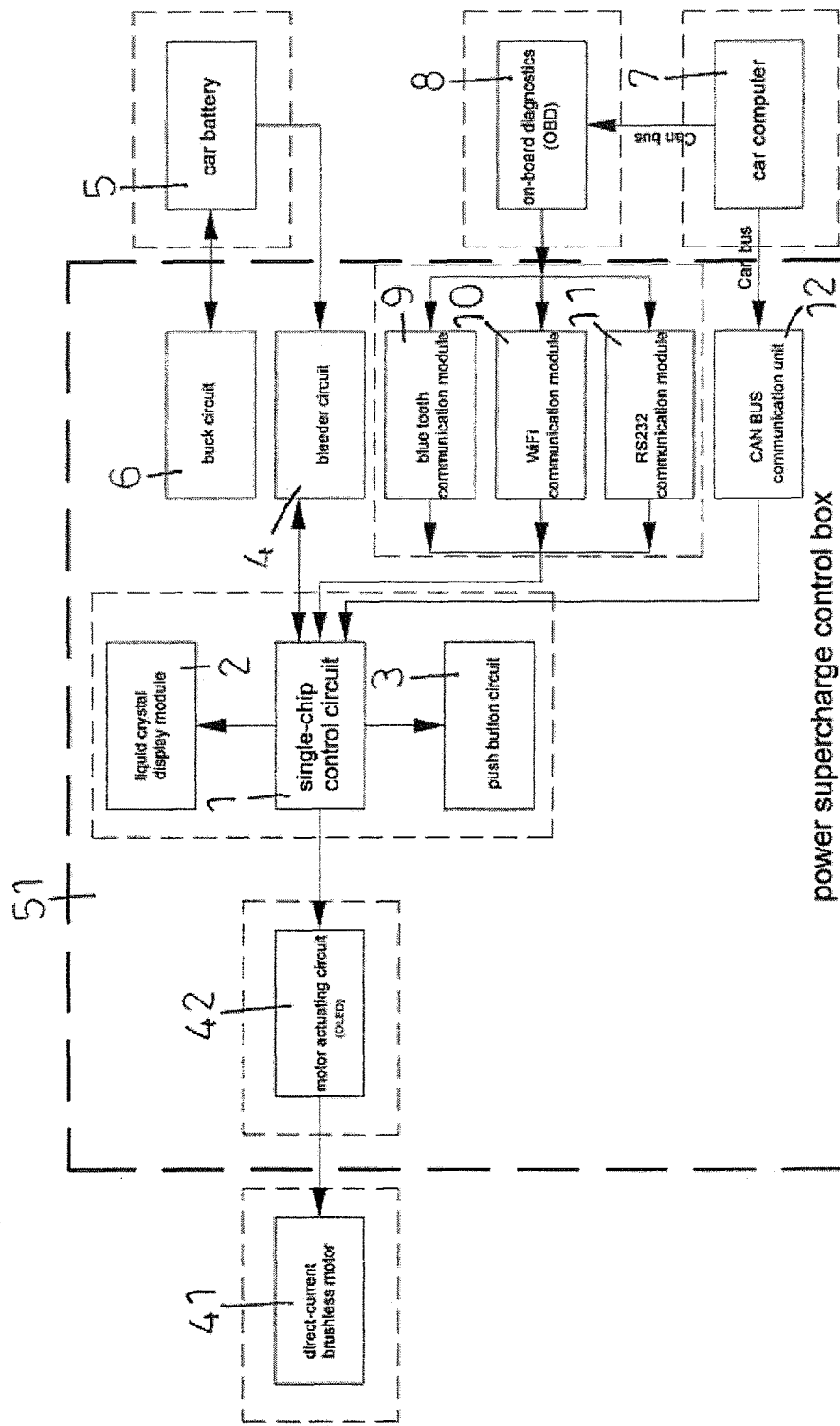
FIG. 7 is another schematic operational block diagram of FIG. 6.

In operation, referring to FIGS. 4-7 with reference to FIGS. 1-3, when the engine 20 is started by the driver, the communication module (including the blue tooth communication module 9, the WiFi communication module 10 or the RS232 communication module 11) communicates with the on-board diagnostics 8 which communicates with the car computer 7 by the controller area network (CAN or CAN BUS), so that the communication module of the power supercharge control box 51 can read the data in the on-board diagnostics 8 and the car computer 7 as shown in FIGS. 4 and 6 so as to detect the rotation speed of the engine 20. Alternatively, the communication unit 12 can directly read the data in the car computer 7 so as to detect the rotation speed of the engine 20. Then, the communication module transmits a signal to the single-chip control circuit 1 as shown in FIGS. 5 and 7. Then, the single-chip control circuit 1 drives the motor actuating circuit 42 which controls the direct-current brushless motor 41 as shown in FIG. 7 to regulate the rotation speed of the air inlet fan 44. At the same time, the air input detector 47 detects the air inlet flow through the air cleaner 30 and the power supercharger 40 into the engine 20 and transmits a signal to the fuel injection supply device 49 so that the fuel injection supply device 49 injects a determined amount of fuel.

Accordingly, the communication module of the power supercharge control box 51 reads the data in the on-board diagnostics 8 and the car computer 7 to detect the rotation speed of the engine 20, so that the fuel-saving and energy-saving car controller of the present invention can properly increase the air input of the engine 20, without increasing the rotation speed of the engine 20, and without increasing the fuel output of the fuel injection supply device 49, such that the fuel is burned completely, thereby preventing the engine 20 from incurring a carbon deposition, and thereby enhancing the working efficiency of the engine 20. In addition, the car can travel a longer distance at the same amount of fuel, thereby saving the fuel and the energy.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A fuel-saving and energy-saving car controller comprising:
   a power supercharge control box (51) electrically connected with a direct-current brushless motor (41) of a power supercharger (40);
   wherein:
   the power supercharger has a first end connected with an engine (20);
   an air cleaner (30) is mounted on a second end of the power supercharger;

the direct-current brushless motor is mounted in the power supercharger and is provided with an air inlet fan (44);

an air input detector (47) is mounted on the power supercharger;

an air throttle (48) is mounted on the engine and is electrically connected with an accelerator pedal to control an air inlet flow into the engine;

a fuel injection supply device (49) is connected with the engine;

the fuel injection supply device is electrically connected with the air input detector and the accelerator pedal;

the air input detector detects the air inlet flow through the air cleaner and the power supercharger into the engine and transmits a signal to the fuel injection supply device so that the fuel injection supply device injects a determined amount of fuel;

the accelerator pedal is driven by a driver's pedaling force to control an air input of the air throttle and to control a fuel output of the fuel injection supply device;

the power supercharge control box is electrically connected with a car battery (5);

the improvement comprising:

the power supercharge control box includes:

a single-chip control circuit (1);

a motor actuating circuit (42) electrically connected between the direct-current brushless motor and the single-chip control circuit;

a liquid crystal display module (2) electrically connected with the single-chip control circuit;

a push button circuit (3) electrically connected with the single-chip control circuit;

a bleeder circuit (4) electrically connected between the single-chip control circuit and the car battery;

a buck circuit (6) electrically connected with the car battery; and a communication module communicating between the single-chip control circuit and an on-board diagnostics (8);

the car battery supplies an electric power to the direct-current brushless motor;

the on-board diagnostics communicates with a car computer (7) by a network;

the communication module of the power supercharge control box reads data in the on-board diagnostics and the car computer so as to detect a rotation speed of the engine;

the communication module transmits a signal to the single-chip control circuit which drives the motor actuating circuit which controls the direct-current brushless motor to regulate a rotation speed of the air inlet fan; and the air input detector detects the air inlet flow through the air cleaner and the power supercharger into the engine and transmits a signal to the fuel injection supply device so that the fuel injection supply device injects a determined amount of fuel.

2. The fuel-saving and energy-saving car controller of claim 1, wherein:

the network is a controller area network (CAN or CAN BUS);

the communication module includes a blue tooth communication module (9), a WiFi communication module (10) or an RS232 communication module (11);

the power supercharge control box further includes a communication unit (12) communicating between the single-chip control circuit and the car computer; and the communication unit is a controller area network (CAN or CAN BUS).

\* \* \* \* \*